US009258717B2

(12) United States Patent
Andersson

(10) Patent No.: US 9,258,717 B2
(45) Date of Patent: Feb. 9, 2016

(54) METHOD AND ARRANGEMENT FOR DETECTING A MALFUNCTIONING TERMINAL

(75) Inventor: Yngve Andersson, Älta (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 188 days.

(21) Appl. No.: 13/976,719

(22) PCT Filed: Dec. 28, 2010

(86) PCT No.: PCT/SE2010/051488

§ 371 (c)(1), (2), (4) Date: Jun. 27, 2013

(87) PCT Pub. No.: WO2012/091641

PCT Pub. Date: Jul. 5, 2012

(65) Prior Publication Data

US 2013/0295918 A1 Nov. 7, 2013

(51) Int. Cl.

*H04W 24/00* (2009.01)
*H04W 24/04* (2009.01)

(52) U.S. Cl.

CPC .............. *H04W 24/00* (2013.01); *H04W 24/04* (2013.01)

(58) Field of Classification Search

CPC ..... H04W 24/00; H04W 24/04; H04W 36/28; H04W 36/30; H04W 76/00; H04W 76/02; H04W 76/027; H04W 76/06; H04W 88/18; H04W 8/30; H04W 24/08; H04W 76/025; H04L 12/14; H04L 29/08927; H04L 63/00; H04L 12/2419; H04L 12/2424; H04M 1/00; H04M 3/22; H04M 3/26; H04B 10/0071; H04B 10/0073; H04B 10/0775; H04B 10/07

USPC ............ 455/26.1, 67.11, 67.14, 67.16, 414.1, 455/414.2, 415, 418–420, 423–425, 434, 455/466, 517, 550.1, 556.2, 560–561; 370/216, 241.1, 242, 395.2, 395.21, 370/395.3, 420, 463; 379/1.01, 2, 321

See application file for complete search history.

(56) References Cited

U.S. PATENT DOCUMENTS

2002/0002062 A1* 1/2002 Itazu et al. .................... 455/557
2002/0072358 A1 6/2002 Schneider et al.

(Continued)

FOREIGN PATENT DOCUMENTS

EP 2 237 596 10/2010
JP 2005-159646 6/2005

(Continued)

OTHER PUBLICATIONS

International Search Report for PCT/SE2010/051488, mailed Oct. 5, 2011.

(Continued)

*Primary Examiner* — Meless Zewdu

(57) ABSTRACT

A method and arrangement in a terminal evaluation unit for detecting a malfunctioning terminal in a cellular network is provided. Connection data is received from at least one network node in the cellular network, wherein the connection data is referring to connections of terminals when present in cells of the cellular network. A mean connection drop rate is calculated based on the connection data for the terminals when present at least in a first cell during a preset time period. An individual connection drop rate which is associated with the first terminal is determined from the connection data. Deciding, based on a ratio between the individual connection drop rate and the mean drop rate, whether or not the first terminal is malfunctioning and providing the result from the deciding action to a cellular network operator for further evaluation.

18 Claims, 7 Drawing Sheets

Start
Receiving connection data 501
Selecting a first terminal set 502
Calculating a mean connection drop rate in cells associated to first terminals 503
Determining an individual connection drop rate associated with at least one terminal in said first terminal set 504
Individual connection drop rate > mean connection drop rate? 505
Yes
No
Creating to list based on IMEI and/or IMEISV 506
Provide list to terminal responsible or customer support 507
Cell mean drop rate > average drop rate 508
No
Yes
Indicating malfunctioning network node 509
End

(56) References Cited

U.S. PATENT DOCUMENTS

| | | | | |
|---|---|---|---|---|
| 2004/0038678 | A1* | 2/2004 | Lescuyer et al. | 455/424 |
| 2005/0276248 | A1* | 12/2005 | Butala et al. | 370/332 |
| 2006/0217115 | A1* | 9/2006 | Cassett et al. | 455/423 |
| 2009/0052330 | A1* | 2/2009 | Matsunaga et al. | 370/242 |
| 2010/0284293 | A1* | 11/2010 | Watanabe et al. | 370/252 |
| 2010/0323689 | A1* | 12/2010 | Topaltzas et al. | 455/425 |

FOREIGN PATENT DOCUMENTS

| | | | |
|---|---|---|---|
| WO | WO 97/36255 | 10/1997 | |
| WO | WO 2009/084421 | 7/2009 | |
| WO | WO 2010/024744 | 3/2010 | |
| WO | WO 2010/024744 A1 * | 3/2010 | H04L 12/24 |

OTHER PUBLICATIONS

3GPP TS 32.108 V0.1.0 3rd Generation Partnership Project: Technical Specification Group Services and System Aspects; Subscriber and Equipment Trace, (Feb. 2002), 48 pages.

Cho, J-J et al., "A Real-Time Observation Scheme for UMTS Networks", Advanced Communication Technology, vol. 01, (Feb. 15-18, 2009), pp. 855-858.

Japanese Office Action issued in Application No. 2013-547393 dated Jul. 4, 2014.

* cited by examiner

METHOD AND ARRANGEMENT FOR DETECTING A MALFUNCTIONING TERMINAL

This application is the U.S. national phase of International Application No. PCT/SE2010/051488, filed 28 Dec. 2010, which designated the U.S., the entire contents of which is incorporated herein by reference.

TECHNICAL FIELD

The invention relates generally to a method and arrangement for detecting a malfunctioning terminal in a cellular network.

BACKGROUND

The overall quality of service has become increasingly important when providing telecommunication services. Therefore, cellular network operators need to manage their quality issues proactively in order to avoid or at least reduce the amount of customer complaints. Network operators whom have lower quality of service compared to their market peers may in some cases experience a loss of subscribers also known as churn rate. One reason may be that subscribers to a greater extent consider changing service provider if the perceived quality is below expectations. High churn rate is naturally having a negative effect on the profitability of the network operator due to the loss of revenue and costs associated with attracting new subscribers to replace the lost ones.

One way to measure perceived quality in a network is to measure the quality of connection establishments in a cell which is associated to a network node. As schematically illustrated in FIG. 1, terminals 110,111,112 may be present and establishing connections in one or more cells associated with one or more network nodes 100*a*, 100*b*. The network nodes 100*a*, 100*b* are normally arranged in connection to a radio network 100 and core network 101. If a terminal 110, 111 or 112 experiences a lost connection the event may be reported and registered to the core network 101.

Parameters which are commonly measured to indicate the perceived quality of network operators' service, is the connection quality in terms of accessibility and retainability. Accessibility is normally the capability to establish the connection between a terminal and a network node while retainability normally means the capability to retain the connection once it is initiated. If a network node 100*a*, 100*b* is indicated to be malfunctioning, the network operator maintenance may, by using performance management, allocate resources to adjust and repair the network node in order to increase the perceived quality in the cells. A post processing system 105 may, according to one example, run tests on the network nodes 100*a*, 100*b* and the core network 101 in order to determine whether or not the terminals in the cells associated with the network node 100*a*, 100*b* are experiencing quality deficiencies. For example, the post processing system may identify certain network nodes having a higher occurrence of unsuccessful connection establishment and dropped connections than other network nodes.

A more reactive way to identify, for example, areas, cells or nodes having poor quality is to measure and monitor customer support feedback and complaints. The initiative then needs to be taken by the subscriber. This reactive indication may in some cases have a poor effect in decreasing churn rate.

It is, however, not possible to measure perceived quality per user when applying the above mentioned techniques for quality measurement. Although the network operators and service providers continuously monitor their network to detect inferior or malfunctioning network nodes, quality problems still exit due to reasons which are not necessarily related to the malfunction of nodes and components of cellular network.

SUMMARY

It is an object of the invention to address at least some of the limitations, problems and issues outlined above. It is also an object to improve the process of detecting malfunctioning terminals in a cellular network. It is possible to achieve these objects and others by using a method and an arrangement as defined in the attached independent claims.

According to one aspect, a method is provided in a terminal evaluation unit for detecting a malfunctioning terminal in a cellular network. Connection data is received from at least one network node in the cellular network, wherein the connection data is referring to connections of terminals when present in cells of the cellular network. A mean connection drop rate is calculated based on the connection data for the terminals when present at least in a first cell during a preset time period. An individual connection drop rate which is associated with the first terminal is determined from the connection data. It is then decided, based on a ratio between the individual connection drop rate and the mean drop rate, whether or not the first terminal is malfunctioning and the result is provided from the deciding action to a cellular network operator for further evaluation.

According to another aspect, an arrangement is provided in a terminal evaluation unit for detecting a malfunctioning terminal in a cellular network. The arrangement comprises a receiving unit which is adapted to receive connection data from at least one network node in the cellular network, wherein the connection data is referring to connections of terminals when present in cells of the cellular network. The arrangement further comprises a calculating unit adapted to determine a mean connection drop rate, based on the connection data, for the terminals when they are present at least in a first cell during a first time period. The terminal evaluation unit further comprises a determining unit which is adapted to determine an individual connection drop rate associated with a first terminal in the preset time period for at least one of the first cells. Also, the individual drop rate is determined based on the connection data. The terminal evaluation unit also comprises a deciding unit which is adapted to decide whether or not the first terminal is malfunctioning, based on a ratio between the individually connection drop rate and the mean drop rate. The result from the deciding unit is handled by a providing unit which is adapted to provide a result from the deciding unit to a cellular network operator.

The above method and arrangement may be configured and implemented according to different embodiments. In one example embodiment, the first terminal is selected for deciding whether or not to be malfunctioning based on at least one of one of: the number of cells where connections have been established by the first terminal in the time period, and the number of connection establishments performed by the first terminal in the time period.

According to another embodiment, the first terminal is further selected such that the number of connection establishments in the time period is above a first threshold number.

According to another optional possible embodiment, the first terminal is further selected such that the number of cells visited in the time period is above a second threshold number.

According to one example embodiment, a first terminal is selected where a subscriber, which is associated with the terminal, is a pre-paid subscriber and wherein the connection drop rate is based on disconnected established connections wherein disconnection was not related to insufficient funds.

According to another example embodiment, the first terminal is further provided and added to a list comprising the International Mobile Terminal Identity (IMEI) and/or IMEI Software Version (IMEISV) of the first terminal. According to another possible embodiment, the first terminal is further determined whether or not to be malfunctioning by comparing an IMEI of the first terminal and/or an IMEISV of the first terminal to an existing list of malfunctioning terminals.

According to one example embodiment, the list is created such that malfunctioning terminals are grouped by one or more of the parameters: terminal vendor, terminal model, manufacturing site or series number.

According to one embodiment, the terminal evaluation unit is providing the result such that the network operators is enabled to generate a message which is automatically sent to the subscriber which is associated with the first terminal. According to another example embodiment, the message is a Short Message Service (SMS) message.

Further possible features and benefits of this solution will become apparent from the detailed description below.

BRIEF DESCRIPTION OF DRAWINGS

The invention will now be described in more detail by means of some example embodiments and with reference to the accompanying drawings, in which.

DETAILED DESCRIPTION

Briefly described, a solution is provided for detecting malfunctioning terminals which may have a negative impact on the subscriber's perceived quality of service in a telecommunication network. In this solution, connection data is used for detecting terminals having a higher rate of disconnected connections compared to other terminals present in the same cells during the same time period. In this description the term "terminals" should be understood to comprise any device having telecommunication connectivity and capabilities in one or more applications. According to one particular example, a terminal may be mobile user equipment for use by a user. According to another example, a terminal may be a device involved in a Machine-to-Machine (M-2-M) communication without any direct user involvement. Reasons for poor quality may, in fact, be even harder to detect and eliminate without any user involvement, at least when conventional technique is used.

In this description, the term "malfunctioning" vis-à-vis to terminals and connection quality should be understood as a terminal having worse performance related to connections and retainability compared to the normal case. A malfunctioning terminal is moreover underperforming in relation to the other connections made by other terminals in the same cell in a preset time period. The underperformance may in some cases be related to poor network properties in a cell and in other cases related to the terminal. One example of a network property which could indicate a terminal as malfunctioning is if the terminal is located in the edge of the cell. If the location of the terminal is persistent, the malfunction state of the terminal will also persist. However, such cases are possible to manually discard as a malfunctioning terminal.

One purpose for producing connection data in a cellular network per connection is to enable billing per connection. According to one example, the connection data may be one or several Call Detail Records (CDRs). Connection data, such as CDRs, also typically comprises additional transactional information of the connection such as the served Mobile Subscriber Integrated Services Digital Network Number (MSISDN) or International Mobile Subscriber Identity (IMSI), terminal International Mobile Equipment Identity (IMEI), the time and cell for connection establishment, service used, time and cell for disconnection and the reason for the disconnection (End of Selection) EOS code. A Serving GRPS Support Node (SGSN) can also provide information associated with the International Mobile Equipment Identity Software Version (IMEI-SV) indicating the Packet Data Protocol (PDP) context of the terminal. In this description, procedures and arrangements for detecting malfunction terminal by analyzing the information provided by connection data for connections associated with a terminal will be further disclosed.

Figure 1:
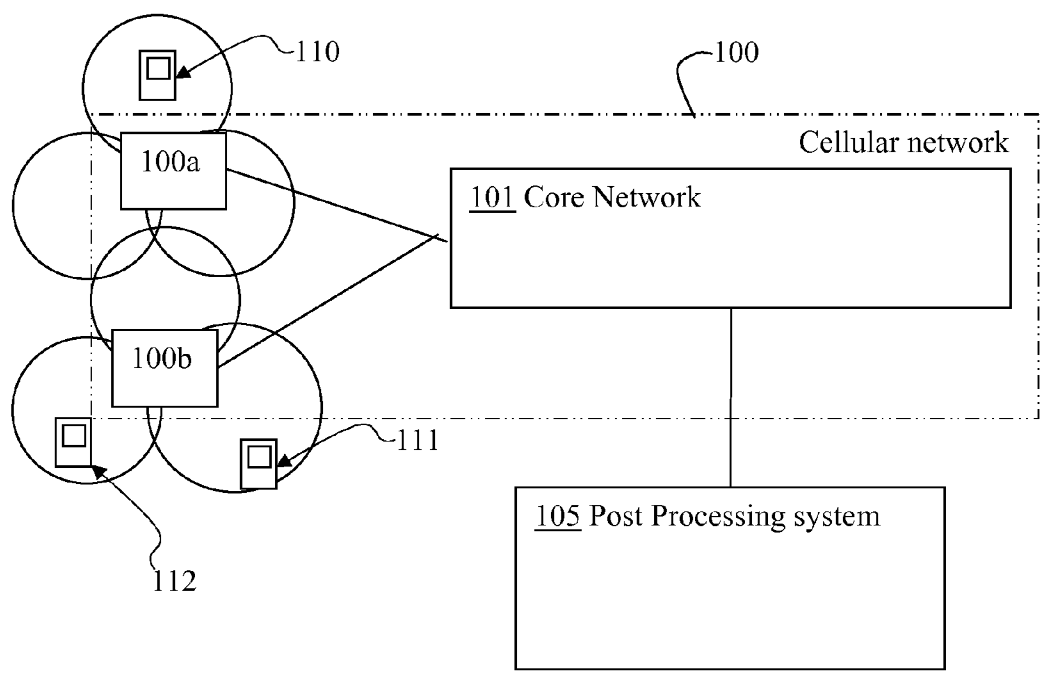
FIG. 1 is a block diagram illustrating a first exemplifying network architecture comprising terminals, radio network nodes, core network and a post processing system, according to prior art.
Figure 2:
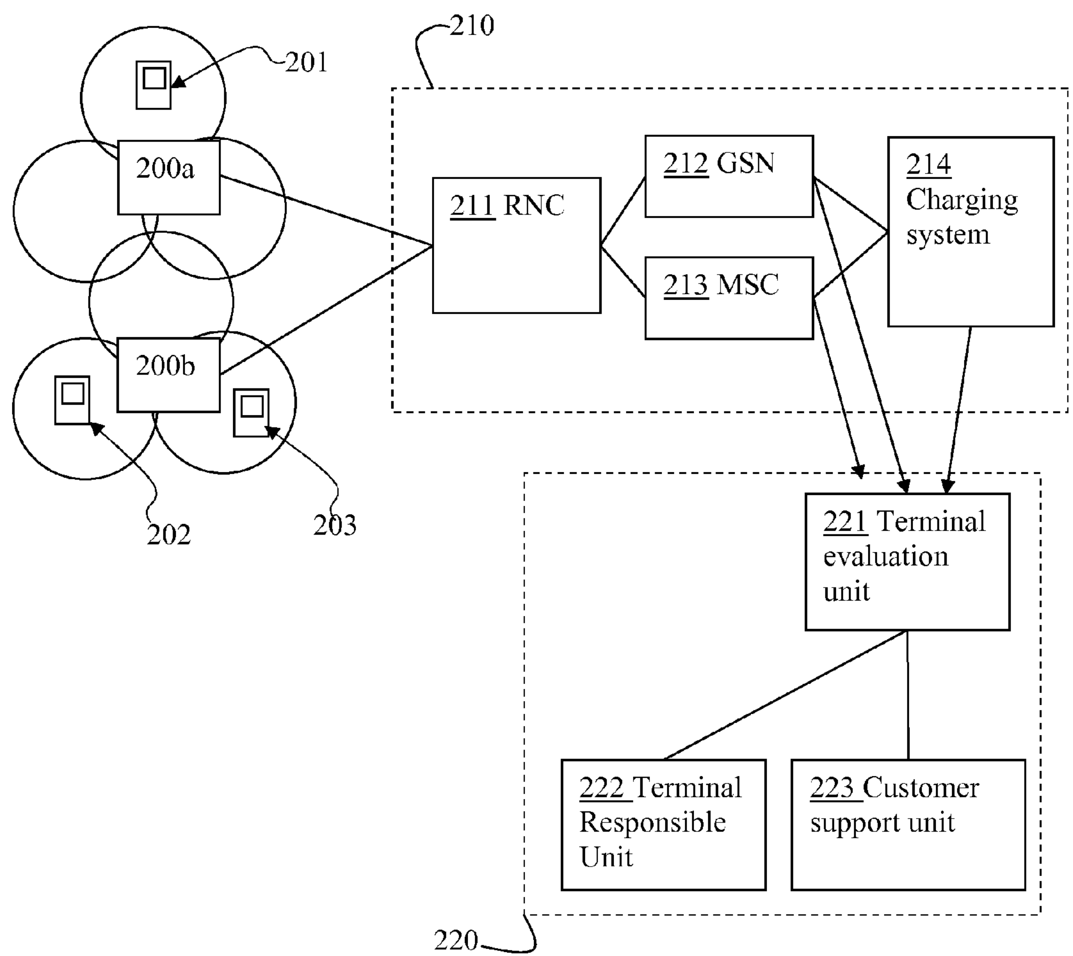
FIG. 2 is a block diagram illustrating a network architecture comprising terminals, radio network nodes, core network nodes, charging system and terminal evaluation units, according to an exemplifying embodiment.

Some features of this solution will now be described with reference to FIG. 2 illustrating an example of an overview of a network architecture comprising a post processing system having a terminal evaluation unit. Terminals 201, 202, 203 establish connections to network nodes 200*a*, 200*b* from an associated cell. The network nodes 200*a*, 200*b* are managed and connected via a controlling unit 211 to the core network 210 where the CDRs are created when the terminals 201, 202, 203 establish connections to the network nodes 200*a*, 200*b*. According to one embodiment, the network node 200*a*, 200*b* is an eNode B which may be arranged to be connected and managed by a Radio Network Controller (RNC) 211. According to another example, the RNC 211 may be a Base Station Controller and where the network nodes 200*a*, 200*b* may be a Base Transceiver Station.

According to one example, the connection data is created in the Mobile Switching Center (MSC) 213 or in a GRPS Support Node (GSN) 212. The MSC and the GSN may be connected to a charging system 214 having responsibility for management of rates and reserves for necessary funds for the subscribers as a part of the delivery of the service. Thus, the charging system 214 is primarily involved when handling terminals 201, 202, 203 used by prepaid subscribers. The charging system 214 also operates to prevent subscribers to overrun the credited funds. The GSN 212, MSC, 213 and the charging system 214 may be arranged to provide connection data to the post processing system 220 comprising a terminal evaluation unit 221. The terminal evaluation unit 221 is adapted to detect malfunctioning terminals based on the provided connection data and to subsequently deliver the result in an accessible manner to a customer support unit 223 and/or a terminal responsible unit 222. By providing an indication of terminals which may be malfunctioning, the network operator is able to take further necessary actions which are, however, outside the scope of this solution.

In this description, the term "connection drop" is used to indicate that a connection is disconnected by reasons other than disconnection requested by the user. For example, a disconnection resulting in connection drop may be caused by battery drain, low signal quality, terminal hardware or software failure or any other reason other than an intended disconnection. Thus, connection drops comprise disconnections due to both connection accessibility related problems and connection retainability problems.

Furthermore, in this description the term "connection drop rate" is used to indicate the frequency of connection drops or connection establishment failures associated with a user and a time period. According to one alternative, connection drop rate may be expressed as a percentage or a ratio. For example, if one of four connections is dropped in a certain time period in a certain cell and for a certain terminal, the connection drop rate is 1:4 or 25%.

In this description, the term "mean connection drop rate" is used to indicate a comparable measurement comprising the mean connection drop rate for at least one specific cell for a certain time period and for two or more established connections. The mean connection drop rate may be compared to other cells and/or compared to the drop rate of a terminal. Although mean is only one way to determine a central value, other measures of central tendency is also comprised in the term "mean connection drop rate". Examples of such central tendency measurements may for instance be: median, mode, weighted mean, midrange and arithmetic mean.

Figure 3A:
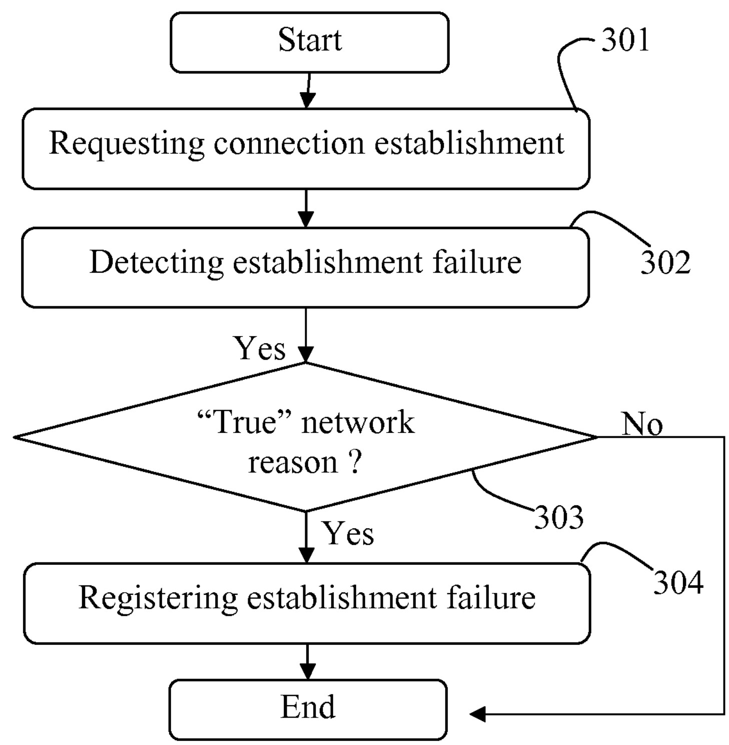
FIG. 3*a* is a flow chart of a procedure for detecting establishment failures and registering the reason for failed establishment, according to an exemplifying embodiment.
Figure 3B:
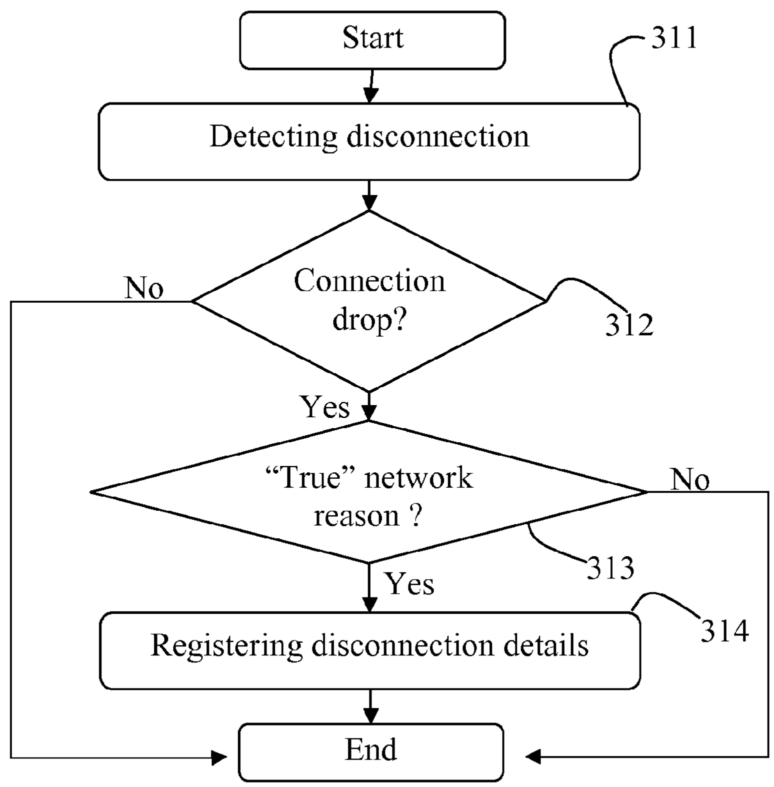
FIG. 3*b* is a flow chart of a procedure for detecting connection drops and registering the reason for the drop, according to an exemplifying embodiment.

Features of this solution will now be described with reference to FIG. 3*a* and FIG. 3*b* illustrating two example procedures of registering connection drops and producing connection data from which malfunctioning terminals may be detected. These procedures may be executed by a terminal evaluation unit such as unit 221 in FIG. 2.

With reference to FIG. 3*a*, a procedure for registering failed establishment attempts is described. FIG. 3*a* generally registers connection data associated with terminals having accessibility issues. In a first action 301, a terminal requests an establishment of a connection to a network node. In action 302 a failure of the requested establishment is detected. Failure of establishment may be an effect of several reasons. Some of the reasons are associated with an underperforming network node or a malfunctioning terminal while other examples of reasons for establishment failures may be insufficient credit balance. The reason for disconnection may also be indicated by an EOS which also can be comprised in connection data. Therefore, the conditional action 303 determines whether or not the reason was related to a "true" network reason such as for example a terminal failure or an underperforming network node. If the establishment failure is associated with a "true" network reason, the failed establishment is registered in action 304, and also normally delivered to the post-processing system and the terminal evaluation unit. The registered connection data may now, for instance, be used for further calculation and analysis of connection drop rates per terminal or mean connection drop rates per cell or network node.

With reference to FIG. 3*b* is a procedure for registering drops of established connections described. FIG. 3*b* generally registers connection data associated with terminals having retainability issues. A first action 311 indicates detecting a disconnection of an established connection between a terminal and a network node. The disconnection may be caused by various different reasons. The most common reasons, which also according to one embodiment is indicated by a dropCall-indicator which may be comprised in the connection data, may include terminal requested disconnection, insufficient funds or credits or network disconnection. The reason for disconnection may also be indicated by an EOS which also can be comprised in connection data. In action 312, which is a conditional action, the disconnection reason is determined. I.e. it is determined whether it is a connection drop caused by the network. If the disconnection reason is not caused by the network the procedure will terminate and no registering of data will be performed. Alternatively, the data may be registered for billing purposes but not for further analysis for detecting malfunctioning terminals. However, if the reason is associated with a network cause and thus considered as a connection drop, the reason for disconnection is determined in action 313. In some connections, the reason may not be a "true" network reason. According to one example, a "false" network connection drop reason is due to insufficient credits of a prepaid subscriber. This type of network drops is normally omitted since there may not be any clear relation between the terminal functionality and the credit balance of the prepaid subscriber. If the disconnection reason is a "true" network problem then the details regarding the disconnection may be registered in action 314. The registered data may now, for instance, be used for further calculation and analysis of connection drop rates per terminal or mean connection drop rates per cell or network node.

Although the procedure in FIGS. 3*a* and 3*b* is described above to be executed related to a detected connection drop other ways are also possible. The above procedure can, for instance, be modified in different ways without departing significantly from the result of this solution. In an example embodiment it may executed on data which is stored. One example of such stored data may be connection data which is gathered from a database located within the core network or in the post processing system. In such an embodiment, the result of the procedure illustrated in FIG. 3*a* and FIG. 3*b* is used for selection of connection data to analyze.

Figure 4:
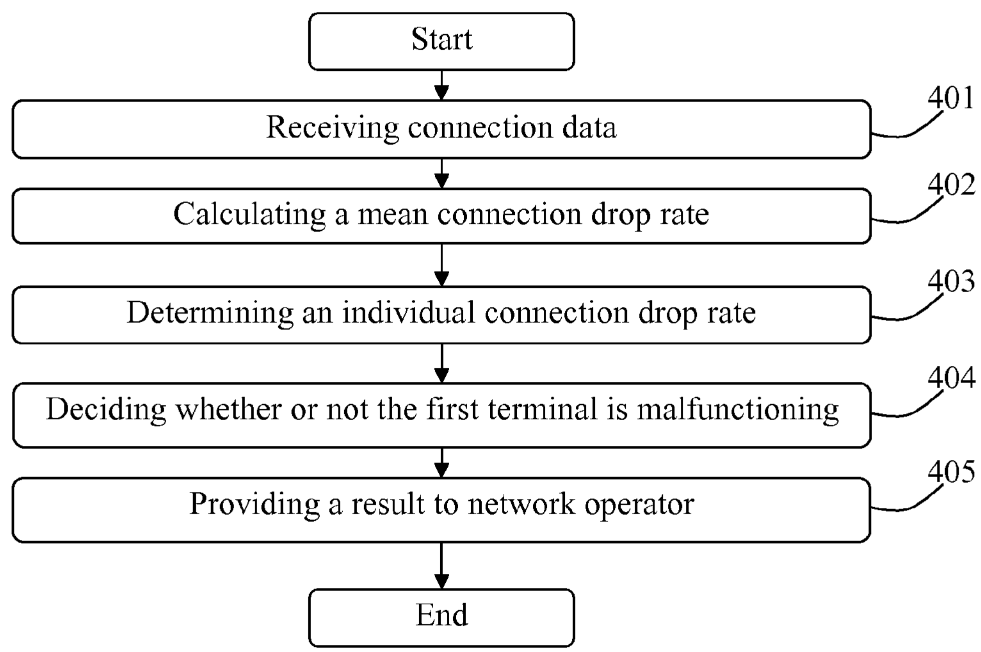
FIG. 4 is a flow chart of a procedure for detecting malfunctioning terminals, according to an exemplifying embodiment.

With reference to FIG. 4, a procedure for detecting malfunctioning terminals will now be described according to an example procedure. This procedure can be executed by one or more logic functions or units within a terminal evaluation unit, which will be described by means of examples further below.

In a first action 401, the terminal evaluation unit receives connection data. The connection data may originate from the cells and the network nodes with which terminals have established connections. The connection data may further be selected or registered according to FIG. 3. According to an example embodiment of action 401, the connection data can be received from entities within the core network where the connection data has been aggregated, collected or manipulated prior to being received by the terminal evaluation unit.

The connection data may comprise various elements of information. In this procedure the connection data at least comprises information regarding disconnections, start and end cell associated with the disconnection, disconnection reasons and an identity indicator for identifying the subscriber associated with the disconnection. The connection data received in action 401 may also comprise various other types of information, such as, but not limited to, IMEI, IMEI-SV, time stamps and cell transitions.

Then, after receiving the connection data, the terminal evaluation unit calculates a mean connection drop rate which is illustrated by action 402. The calculation is based on the received connection data for at least a first cell individually. The mean connection drop rate also needs to be calculated for a first time period, which may be preset by the system, a user or another entity. The time period may be longer if the amounts of established connections are few. However, for cells with terminals having many established connections per time unit, the preset time period may be shorter.

By executing action 402, the terminal evaluation unit acquires a reference per cell to which an individual terminal may be compared. Indicated by action 403 a comparable measurement is determined, which enables analysis to decide whether or not a terminal is malfunctioning. The terminal unit determines individual connection drop rates for at least one of the terminals indicated in the connection data. I.e. the drop rate is calculated for a terminal and for at least one cell in which the terminal has established connections. The individual drop rate further needs to be calculated for the first time period.

The terminal evaluation unit decides, in action 404, whether or not the first terminal is malfunctioning by comparing the individual connection drop rate to the mean drop rate for at least one of the cells. If the first terminal indicates a higher connection drop rate than the average cell drop rate, a malfunctioning terminal might be the reason for connection drops. The result from action 404 is provided from the terminal evaluation unit to a cellular network operator in action 405, thereby enabling further proactive actions. According to one example, the terminal evaluation unit provides the result to the customer service and/or a terminal responsible unit. The network operator is now enabled to actively contact subscribers having a malfunctioning terminal. This may be done in an automated, semi-automated or manual manner. For instance, a message, such as a Short Message Service (SMS) message, may be sent to the terminal information about the indicated malfunction of the terminal.

Additional advantages associated with the above-described solution of determining malfunctioning terminals include to pin-point terminals contributing to a perceived inferior quality of service. One possible advantage is to enable the terminal evaluation unit to determine this based on the individual terminal, instead of inferior cells or network nodes as currently being done according to the prior art.

The above procedure can be modified in different ways without departing from the invention. For example, the process may be performed on behalf of a subscriber who wants to determine whether or not a terminal is malfunctioning.

Figure 5:
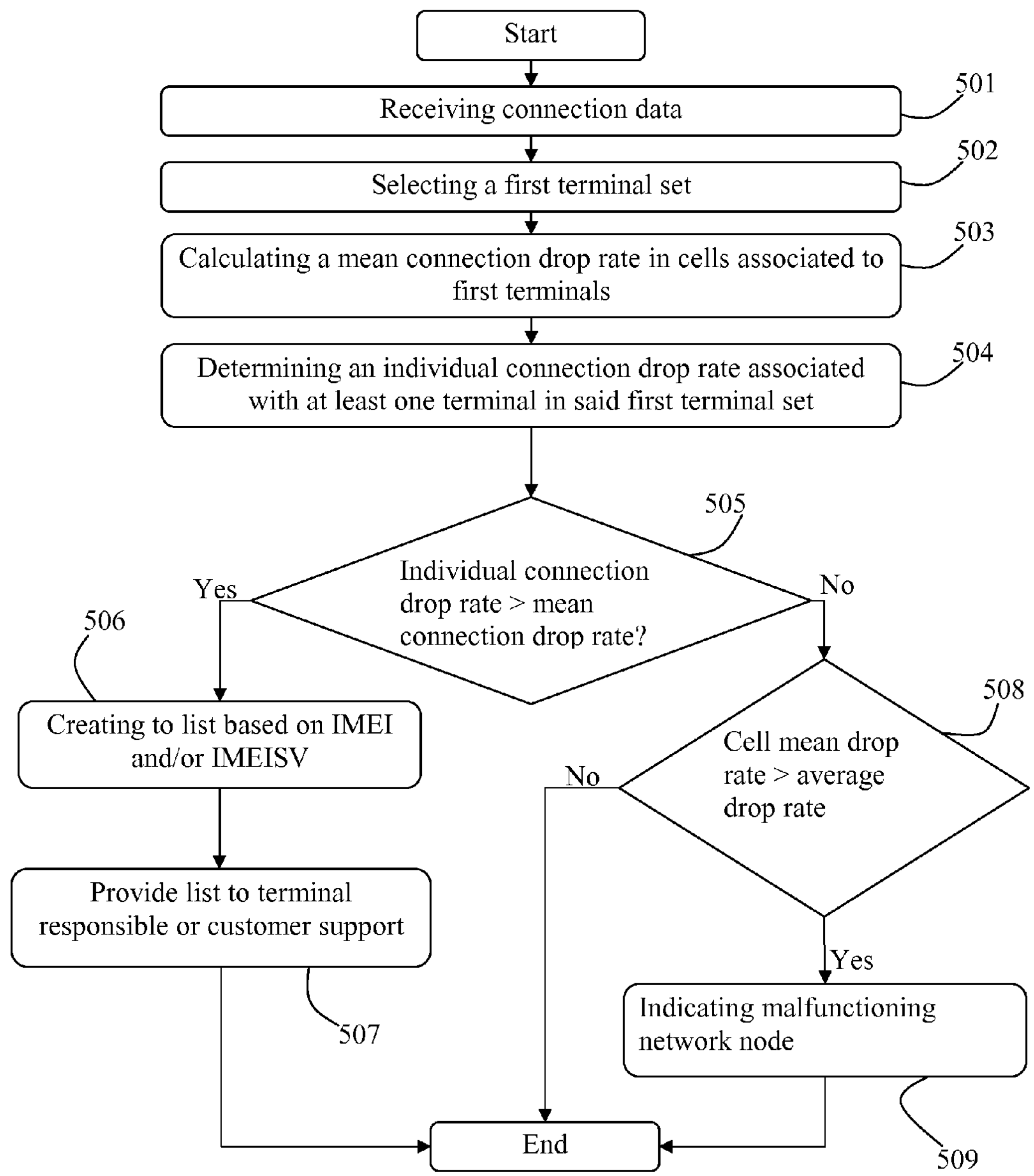
FIG. 5 is a flow chart of a procedure for selecting terminals for detection whether or not to be malfunctioning, according to an exemplifying embodiment.

With reference to FIG. 5, a procedure, comprising various optional steps, for detecting malfunctioning terminals in a terminal evaluation unit will now be described. In a first action 501 the terminal evaluation unit receives connection data from the cells and the network nodes with which terminals have established connections. According to an example embodiment of action 501, the connection data can be received from entities within the cellular network where the connection data has been aggregated, collected or manipulated prior to be received by the terminal evaluation unit. In this embodiment of action 501, the connection data comprises at least start time and end time of the connection, disconnection reason, IMEI, start cell and end cell of the connection.

In a second and optional action 502, a first terminal set is selected based on the identities of the terminals in the connection data received in action 501. The first terminal set may be selected such that each terminal in the first terminal set satisfies one or more predefined conditions. Examples of such conditions may refer to a threshold number of established connections, a threshold number of cells visited or a threshold number of disconnection having a certain disconnection reason. According to another example, the first terminal set may be selected based on terminal connections in a specific time period. The time period may vary depending on the characteristics of the cell, but according to one exemplary embodiment, the time period is set to one week. According to another example, the time period is set to a length which gives the amount of connection data a statistical significance. In such case, the time period may be determined as a function of the connection activity in the cell.

Then, the terminal evaluation unit calculates a mean connection drop rate individually for at least one cell which is indicated by the connection data which is associated to the selected first terminal set. This is illustrated by action 503. The mean connection drop rate also needs to be calculated for a first time period, which may be preset by the system, user or another entity. The time period may also be preset in action 502, in such case the same time period is used in action 503. The time period may be longer if the amount of established connections is small. However, for cells with terminals having high established connections per time unit, the preset time period may be shorter.

Indicated by action 504, a comparable measurement is determined, which enables analysis to decide whether or not a terminal is malfunctioning. In this action, the terminal evaluation unit determines an individual connection drop rate for at least one of the terminals comprised in the first terminal set. I.e. the drop rate is calculated for the terminal and for at least one cell in which the terminal has established connections. The individual drop rate further needs to be calculated for the same time period as in action 503. In a conditional action 505, the drop rate associated to a terminal from the first terminal set is compared to the mean drop rate of the cells wherein the first terminals have made connections. According to one example, at least one cell is compared to the individual drop rate in this action to determine whether or not the terminal have a higher drop rate than the mean drop rate in the cell. According to another example of executing this action, the individual drop rate is compared for each cell visited, and the result of each comparison is aggregated into a single result.

If a terminal is not determined to have higher connection drop rate than the cells visited, an optional action 508 may be performed where a cell mean drop rate is compared to an average of the drop rates calculated in action 503. If a drop rate of a cell is above the average drop rate for other cells, this might indicate that the cell needs attention from network maintenance which is indicated in optional action 509 of indicating a malfunctioning network node.

Now, returning to action 505 of FIG. 5, if it is determined that a terminal from the first terminal set have an individual connection drop rate which is above the mean connection drop rate, this may indicate that the hardware or software of the terminal affects the connection retainability negatively. A terminal which affects the subscribers' perception of the quality of the service providers telecommunication service may be avoided in the future if detected to be malfunctioning according to the above described procedure. In some scenarios, terminals are offered on the market by vendors where the terminals have hardware and/or software related deficiencies. Thus, if a terminal is detected as malfunctioning there may be an increased risk that terminal models from the same vendor and/or same manufacturing plant and/or the same production series also have these hardware or software related issues which negatively affects the retainability of the connections. In action 506, a list is created based on the identity of the terminal, such as the IMEI or IMEISV. By grouping the result for the procedure by any one of terminal model, terminal vendor, manufacturing plant or production series, a customer service or terminal responsible may more easily report malfunctioning terminal groups. The list is finally provided to the terminal responsible unit or the customer support unit in action 507. Thereby, a customer care department or the like may proactively contact subscribers having a malfunctioning terminal. Enabling proactive customer care may decrease subscriber churn rate. As a result of the action of 507, customers care can be focused on the most valuable subscribers by providing a list which may be sorted on, for instance, profitability or spending ratio.

According to another aspect of the solution to be described with reference to FIG. 6, an arrangement in a terminal evaluation unit 600 is provided. The terminal evaluation unit 600 can be configured to basically operate according to any of the examples described above for FIGS. 2-5, whenever appropriate. According to this arrangement, a receiving unit 601 is adapted to receive connection data from at least one cellular network node 601 which is indicated by action 6:1. The connection data may comprise various elements of information. In this embodiment the connection data at least comprises information regarding disconnections, start and end cell associated with the disconnection, disconnection reasons and an identity indicator for identifying the subscriber associated with the disconnection. The connection data received in action 6:1 may also comprise various other types of information, such as, but not limited to, IMEI, IMEI-SV, time stamps and cell transitions.

The terminal evaluation unit also comprises a processing unit 606 and a memory unit 607 which are arranged in connection with the units of the terminal evaluation unit 600. The receiving unit 601 may be further adapted to provide the connection data to a calculation unit 602 and a determining unit 603 which is indicated by actions 6:2a, 6:2b. According to one example, the receiving unit 601 is adapted to receive and store connection data from several cellular network nodes 610 prior to providing the collected connection data to the calculating unit 602 and determining unit 603.

The calculating unit 602 is adapted to calculate a mean connection drop rate for at least one of the cells indicated by the connection data. The calculation unit 602 is further adapted to provide the result to a deciding unit 604 which is indicated in action 6:3. The calculation unit may be further adapted calculate the mean connection drop rate in a first time period, which may be preset. The time period may be longer if the amounts of established connections, according to the provided connection data, are few. However, for cells with terminals having high established connections per time unit, the preset time period may be shorter.

The determining unit 603 is adapted to determine individual connection drop rates for at least one of the terminals indicated in the connection data. I.e. the determining unit is adapted to calculate the drop rate for a terminal and for at least one cell in which the terminal has established connections. Further, the individual drop rate needs to be calculated for the first time period. The determining unit 603 is further adapted to provide the result to a deciding unit 604 which is indicated in action 6:4.

The deciding unit 604 is adapted to decide, based on the provided drop rates, whether or not a first terminal is malfunctioning by comparing the provided individual connection drop rate to the mean drop rate for at least one of the cells. The deciding unit 604 is adapted to decide if the first terminal indicates a higher connection drop rate than the average cell drop rate a malfunctioning terminal might be the reason for connection drops. The deciding unit is adapted to provide the result to a providing unit 605, as indicated in action 6:5. The providing unit 605 is then adapted to provide the result to a customer support unit 620 and/or a terminal responsible unit 630, as indicated by an action 6:6.

Some possible advantages associated with the above-described arrangement for determining malfunctioning terminals include to pin-point terminals contributing to a perceived inferior quality of service. The customer support unit 620 may now enable a customer support to contact the subscriber using the malfunctioning terminal proactively. The terminal responsible unit 630 may now enable the terminal responsible to contact a vendor or provider of a malfunctioning terminal model to exchange the malfunctioning terminal into a functioning terminal.

Figure 6:
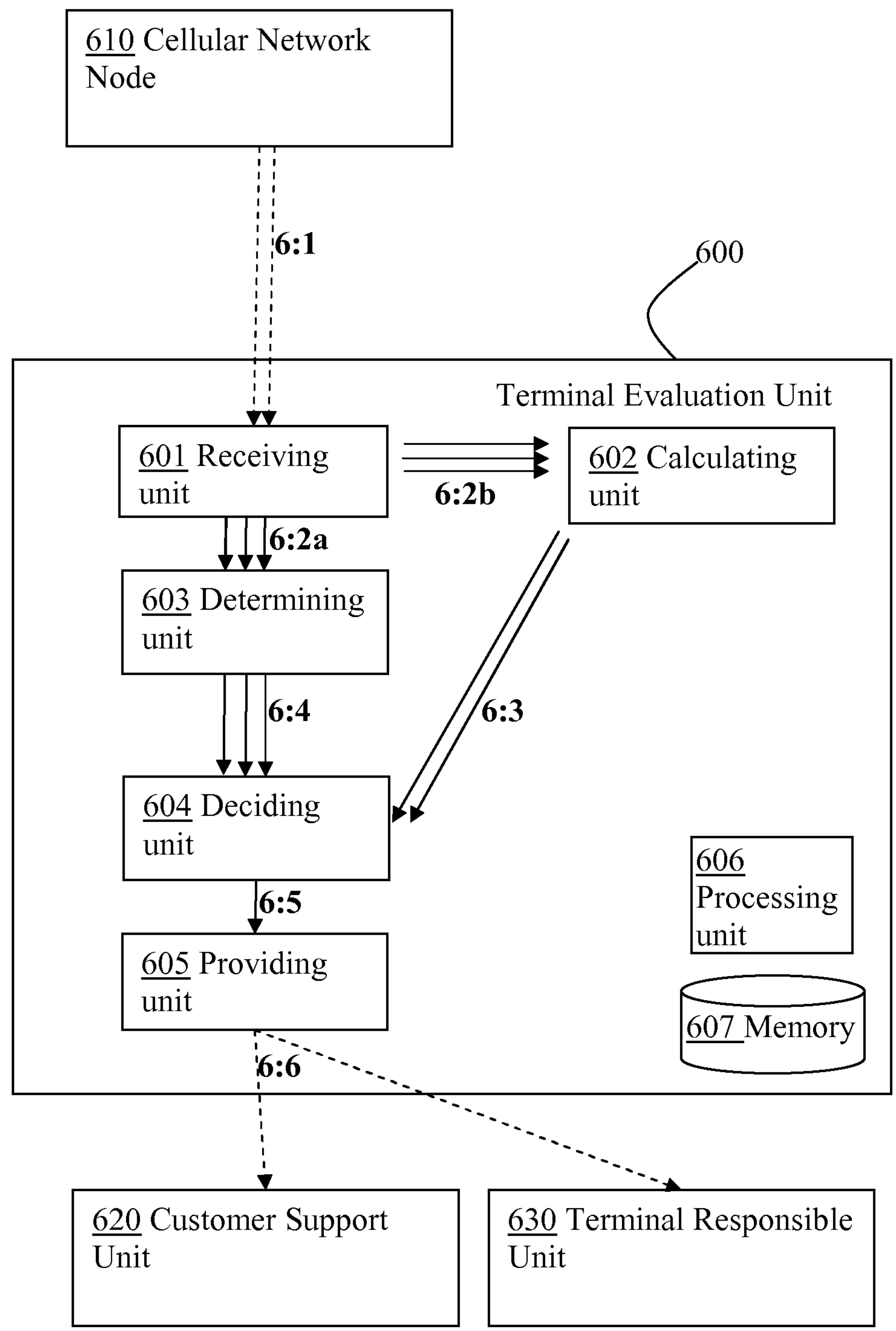
FIG. 6 is a block diagram illustrating an arrangement of a terminal evaluation unit, according to an exemplifying embodiment.
Figure 7:
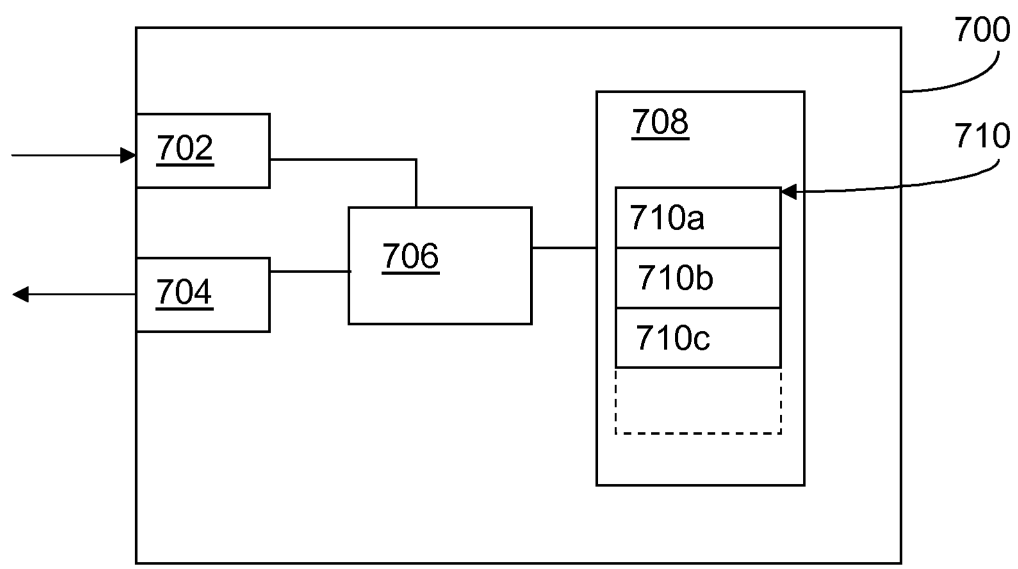
FIG. 7 is a block diagram illustrating an arrangement in a terminal evaluation unit having a computer program product, according to an exemplifying embodiment.

FIG. 7 schematically shows an embodiment of an arrangement 700 in a terminal evaluation unit, which also can be an alternative way of disclosing an embodiment of the arrangement for detecting malfunctioning terminals in a terminal evaluation unit illustrated in FIG. 6. Comprised in the arrangement 700 are here a processing unit 706, e.g. with a DSP (Digital Signal Processor) and a calculation, determination and a deciding module. The processing unit 706 can be a single unit or a plurality of units to perform different actions of procedures described herein. The arrangement 700 may also comprise an input unit 702 for receiving signals and information from other entities, and an output unit 704 for providing signals and information to other entities. The input unit 702 and the output unit 704 may be arranged as an integrated entity.

Furthermore, the arrangement 700 comprises at least one computer program product 708 in the form of a non-volatile memory, e.g. an EEPROM (Electrically Erasable Programmable Read-Only Memory), a flash memory and a disk drive. The computer program product 708 comprises a computer program 710, which comprises code means, which when run in the processing unit 706 in the arrangement 700 causes the arrangement and/or the terminal evaluation unit to perform the actions of the procedures described earlier in conjunction with FIG. 4 or FIG. 5.

The computer program 710 may be configured as a computer program code structured in computer program modules. Hence in the example embodiments described, the code means in the computer program 710 of the arrangement 700 comprises a receiving module 710*a* for receiving and optionally storing and modifying connection data. The computer program further comprises a calculation module 710*b* for calculating a mean connection drop rate for one or several cells individually in a certain first time period. The computer program 710 further comprises a determining module 710*c* for determining the drop rate which is individual to a terminal in a certain cell. The computer program also comprises a deciding module 710*d* for deciding, based on the determined individual drop rate and the calculated mean drop rate, whether or not a terminal is malfunctioning. The result may be provided using the output unit 704 to a network operator such as customer support and/or a terminal responsible.

The modules 710*a-d* could essentially perform the actions of the flow illustrated in FIG. 4, to emulate the arrangement in a video decoding entity illustrated in FIG. 6. In other words, when the different modules 710*a-d* are run on the processing unit 706, they correspond to the units 601-604 of FIG. 6.

Similarly, a corresponding alternative to perform the actions of the flow illustrated in FIG. 5 is possible.

Although the code means in the embodiment disclosed above in conjunction with FIG. 7 are implemented as computer program modules which when run on the processing unit causes the arrangement and/or video handling/presenting entity to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product comprises a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the data receiving unit.

While the invention has been described with reference to specific exemplary embodiments, the description is generally only intended to illustrate the inventive concept and should not be taken as limiting the scope of the invention. For example, the terms "connection data", "terminal evaluation unit", "customer support unit", "terminal responsible unit", and "charging system", have been used throughout this description, although any other corresponding functions, parameters, nodes and/or units could also be used having the functionalities and characteristics described here. The invention is defined by the appended claims.

ABBREVIATIONS

ASIC—Application Specific Integrated Circuit
CDR—Call Detail Record
CPU—Central Processing Unit
EOS—End Of Selection
EEPROM—Electrically Erasable Programmable Read-Only Memory
GSN—GPRS Support Node
IMEI—International Mobile Equipment Identity
IMEISV—International Mobile Equipment Identity Software Version
MCS—Mobile Switching Centre
MSISDN—Mobile Subscriber Integrated Services Digital Network Number
NAS—Non-Access Stratum
PDP—Packet Data Protocol
RNC—Radio Network Controller
ROM—Read-Only Memory
RAM—Random Access Memory
SGSN—Serving GRPS Support Node

The invention claimed is:

1. A method in a terminal evaluation unit for detecting a malfunctioning terminal in a cellular network, the method comprising:

receiving connection data from at least one network node in said cellular network, wherein said connection data is referring to connections of terminals when present in cells of said cellular network;

calculating, based on said connection data, a mean connection drop rate for said terminals when present at least in a first cell of said cells of said cellular network during a first time period;

determining, from said connection data, an individual terminal connection drop rate associated with a first terminal in said first time period for at least one of said first cells;

deciding, whether or not said first terminal is malfunctioning, based on a ratio between said individual terminal connection drop rate and said mean connection drop rate; and providing, a result from the deciding to an operator of said cellular network, wherein said first terminal is selected for deciding whether or not to be malfunctioning based on at least one of: a number of cells wherein connections have been established by said first terminal in said first time period, and a number of connection establishments performed by said first terminal in said first time period.

2. The method according to claim 1, wherein said first terminal is further selected such that said number of connection establishments in said time period is above a first threshold number.

3. The method according to claim 1, wherein said first terminal is further selected such that a number of cells visited in a preset time period is above a second threshold number.

4. The method according to claim 1, wherein said first terminal is selected such that a subscriber, which is associated with said terminal, is a pre-paid subscriber and wherein said connection drop rate is based on disconnected established connections wherein disconnection was not related to insufficient funds.

5. The method according to claim 1, wherein said first terminal is further provided and added to a list comprising an International Mobile Terminal Identity (IMEI) and/or IMEI Software Version (IMEISV) of the first terminal.

6. The method according to claim 1, wherein said first terminal is further determined whether or not to be malfunctioning by comparing a IMEI of said first terminal and/or a IMEISV of said first terminal to an existing list of malfunctioning terminals.

7. The method according to claim 5, wherein said list is created such that malfunctioning terminals are grouped by one or more parameters comprising: terminal vendor, terminal model, manufacturing site or series number.

8. The method according to claim 1, wherein the action of providing further comprises to enable said network operators to generate a message which is automatically sent to the subscriber which is associated with said first terminal.

9. The method according to claim 8, wherein said message is a Short Message Service (SMS) message.

10. A terminal evaluation unit for detecting a malfunctioning terminal in a cellular network, said terminal evaluation unit comprising:

at least one microprocessor;

a non-transitory computer-readable storage medium comprising computer-readable instructions, when executed by said at least one microprocessor, are configured to:

receive connection data from at least one network node in said cellular network, wherein said connection data is referring to connections of terminals when present in cells of said cellular network;

determine, from said connection data, a mean connection drop rate for said terminals when present at least in a first cell of said cells of said cellular network during a first time period;

determine, from said connection data, an individual terminal connection drop rate associated with a first terminal in said preset time period for at least one of said first cells;

decide whether or not the first terminal is malfunctioning, based on a ratio between said individual terminal connection drop rate and said mean connection drop rate; and provide a result from the deciding unit to an operator of said cellular networkff, wherein the computer-readable instructions configured to decide is further configured to decide whether or not said first terminal is malfunctioning based on a number of cells wherein connections have been established by said first terminal in said first time period, and a number of connection establishments performed by the first terminal in said first time period.

11. The terminal evaluation unit according to claim 10, wherein the computer-readable instructions are further configured to select first terminals such that said number of connection establishments in said first time period is above a first threshold number.

12. The terminal evaluation unit according to claim 10, wherein the computer-readable instructions are further configured to select said first terminal such that a number of cells visited in said first time period is above a second threshold number.

13. The terminal evaluation unit according to claim 10, wherein the computer-readable instructions are further configured to select such that a subscriber, which is associated with said first terminal, is a pre-paid subscriber and wherein said connection drop rate is based on disconnected established connections wherein disconnection was not related to insufficient funds.

14. The terminal evaluation unit according to claim 10, wherein the computer-readable instructions are further configured to provide and add said first terminal to a list comprising a International Mobile Terminal Identity (IMEI) and/or IMEI Software Version (IMEISV) of said first terminal.

15. The terminal evaluation unit according to claim 10, wherein the computer-readable instructions are further configured to determine whether or not the first terminal is malfunctioning by comparing an IMEI of said first terminal and/or an IMEISV of said first terminal to an existing list of malfunctioning terminals.

16. The terminal evaluation unit according to claim 15, wherein the computer-readable instructions are further configured to adapted to create said list such that malfunctioning terminals are grouped by one or more parameters comprising: terminal vendor, terminal model, manufacturing site or series number.

17. The terminal evaluation unit according to claim 10, wherein the computer-readable instructions are further configured to enable said network operator to generate a message which is automatically sent to the subscriber associated with said first terminal.

18. The terminal evaluation unit according to claim 10, wherein the computer-readable instructions are further configured to enable said network operator to generate a message as a Short Message Service (SMS) message.

* * * * *